W. BEACH.
Corn Harvester.
No. 25,699.  Patented Oct. 4, 1859.
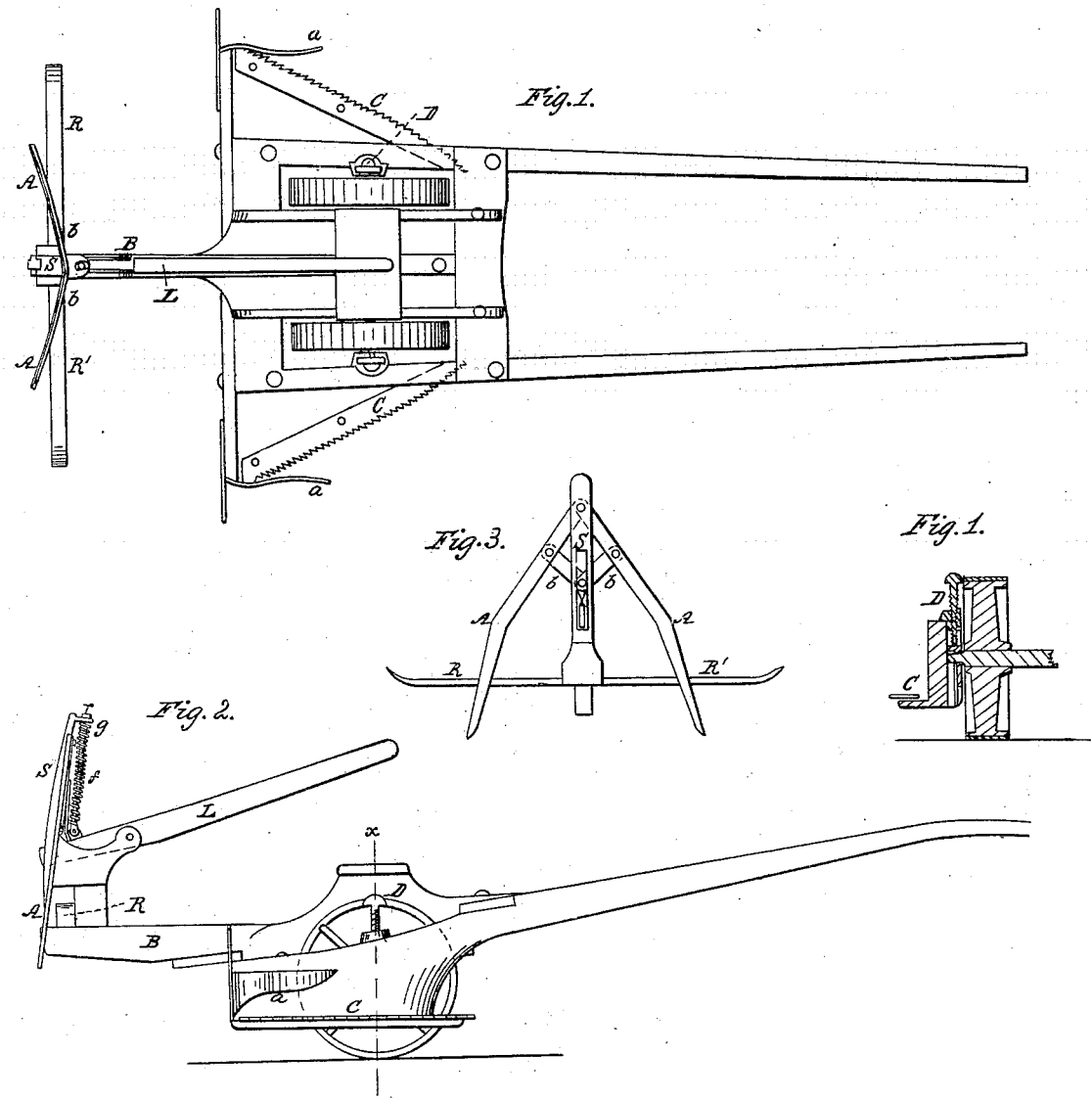
Witnesses:
Inventor:

UNITED STATES PATENT OFFICE.

WALDREN BEACH, OF BALTIMORE, MARYLAND, ASSIGNOR TO HIMSELF AND JOHN L. REESE, JR., OF SAME PLACE.

IMPROVEMENT IN CORN-HARVESTERS.

Specification forming part of Letters Patent No. 25,699, dated October 4, 1859.

*To all whom it may concern:*

Be it known that I, WALDREN BEACH, of Baltimore, in the county of Baltimore and State of Maryland, have invented a new and useful Improvement in Corn-Harvesters; and I do hereby declare that the following is a full, clear, and exact description of the same, reference being had to the annexed drawings forming part of this specification, in the several figures of which similar characters of reference denote the same part.

Figure 1 is a plan view of my harvester. Fig 2 is a side elevation of the same. Fig. 3 is a rear view of the discharging mechanism. Fig. 4 is a vertical section on line $x\ x$, showing the adjustability of the cutters.

The nature of the invention consists in oblique cutters on each side for cutting off the corn, which are vertically adjustable by means of the axle of the wheels fitting into boxes having screws on top, by which the wheels are moved up or down, thus regulating the distance from the ground at which the corn is cut. Behind is a rest or receiver and a beam extending back from the center of the machine, having another rest on the end of it. On these rests the corn falls after it is cut off. Above this last rest is a slotted standard having two arms jointed to it and extending down back of the rest. In the slot of the standard is one end of a lever, which extends forward to the seat of the driver, and has jointed to it two braces, which are also attached to the long arms. Attached to this lever is a rod, which moves vertically through a spiral spring and a guide at the top of the standard, so that, the machine being driven between the rows of corn and the cutters adjusted as desired, the corn is cut off and falls back across the rests, and when they become full the driver draws down the lever, and by means of its connection with the jointed arms by the braces they are expanded and throw the corn off the rests, and the spiral spring acts on the rod attached to the lever and forces it and the arms down again. The machine is then driven on again.

In the drawings, C represents the oblique cutters; D, the screws by which they are adjusted vertically; $a$, the bearers that hold the corn while being cut. B is the beam extending behind the machine; R and R′, the rests on which the corn falls as it is cut down. S is the slotted standard; L, the lever, having its fulcrum at $e$; A, the arms jointed to standard S; $b\ b$, the braces from lever L to arms A. $r$ is the vertically-moving rod attached to lever L and moving through the spiral spring $f$ and the guide $g$ at the top of the standard S.

The cutters having been adjusted according to the desired length of the corn to be cut, the machine is driven between the rows of corn, which is cut off by cutters C and falls back on the rests R R′, and when they become full the driver pulls down lever L, which, by means of its connection by braces $b$, expands the jointed arms A and throws the corn off the rests, and by the movement of the lever the rod $r$, which is attached to it, moves up through the spring $f$ and guide $g$, and as soon as the driver lets go the lever the spring $f$ forces the rod $r$, and consequently lever L and arms A, down again, and the machine is driven on until the rests again become full, when they are discharged as before.

I claim—

The vertically-adjustable cutting apparatus C, in combination with rests R R′, lever L, jointed arms A, and spring $f$, operating substantially as and for the purposes set forth.

In testimony whereof I have hereunto signed my name before two subscribing witnesses.

WALDREN BEACH.

Witnesses:
STEPHEN PRYOR,
C. HANSON,
P. COE.